Patented Feb. 28, 1928.

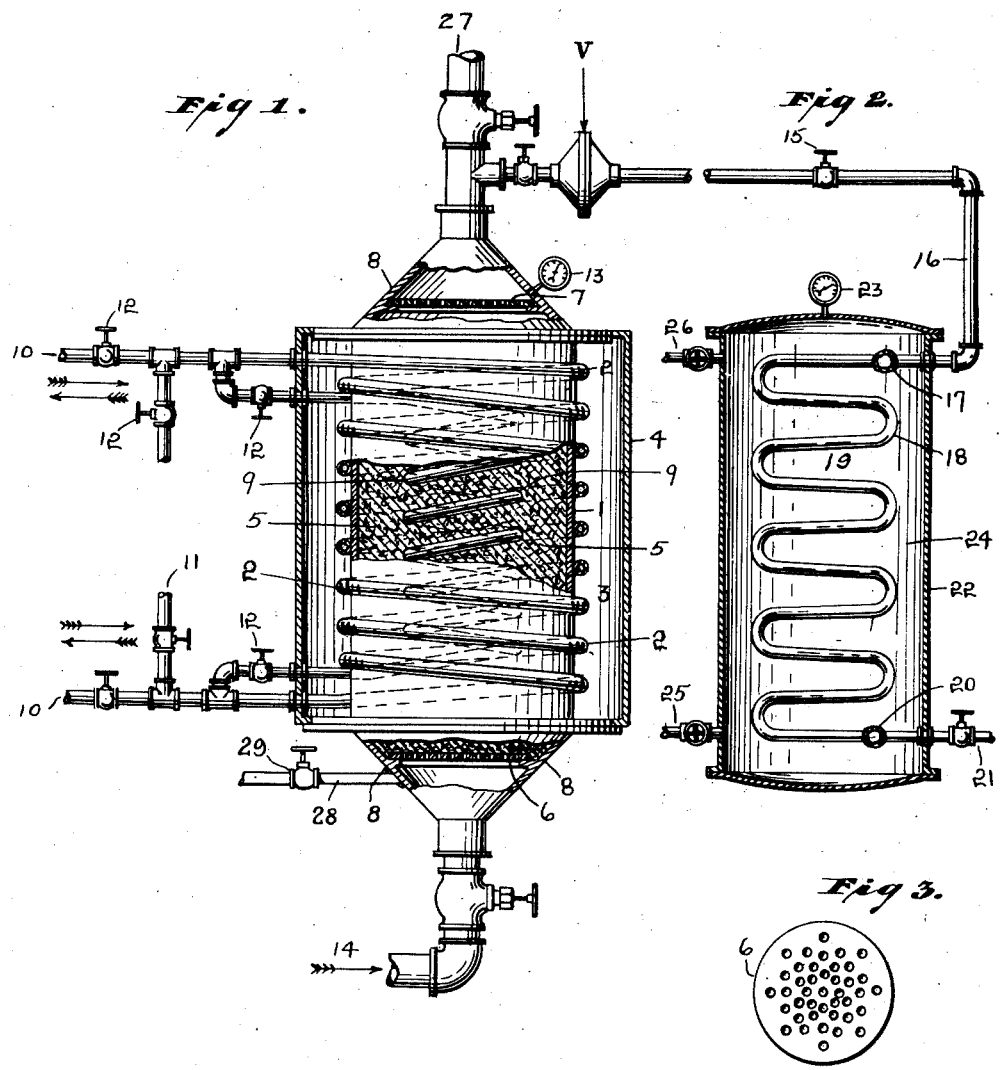

1,661,104

UNITED STATES PATENT OFFICE.

OSCAR L. BARNEBEY, OF COLUMBUS, OHIO, ASSIGNOR TO AMERICAN SOLVENT RECOVERY CORPORATION, A CORPORATION OF OHIO.

APPARATUS FOR TREATING GASES.

Application filed January 21, 1925. Serial No. 3,880.

This invention applies to apparatus which can be economically and efficiently operated in order to concentrate, separate and liquefy gases and vapors in a thoroughly satisfactory manner.

The apparatus may be used to purify gases in which case the apparatus removes all impurities from gases being treated, such as in the purification of air from impurities imparted to it by industrial contamination, rendering the air pure.

The apparatus can be used to separate valuable industrial gases, which have been lost in commercial operations, from air or from other diluent gases and after separation the apparatus can be functioned in such a manner as to concentrate or liquefy the gas or vapor which has been removed from the diluent gases.

The apparatus can also be used to remove certain constituents of gaseous mixtures and recover those constituents in a usable form.

The apparatus comprises a container which possesses means for supporting and holding solid absorbing medium in position. The solid absorbent is activated charcoal. Within the bed of activated charcoal is embedded heating and cooling coils for the rapid transfer of heat to activated charcoal and rapid transfer of heat away from the same.

Outside of the container is also placed cooling and heating coil means, along with insulation to enable better control of temperature conditions within the bed of activated charcoal.

Means are provided for intake of gaseous mixture and exit of the unadsorbed gases from the bed of activated charcoal. Means are also provided for exit of distilled vapor from the apparatus to a condenser wherein gases may be cooled and liquefied.

The condenser is provided with cooling means in order to liquefy or thoroughly cool the distilled gases or vapors.

The heating and cooling coils for transfer of heat to and from the activated charcoal, the gas intakes and exits, the connections to condensers, the condenser intake means and exit from the condensers all possess valvular control means with which the functioning of the various component parts can be efficiently controlled.

Referring to the accompanying drawings in which the parts are identified by their reference characters, the invention will now be described in detail.

Fig. I is an elevation with parts of the device illustrated in section and other parts broken away in order to show the internal structure.

Fig. II is a perspective view showing the interior of the condenser.

Fig. III is a plan view of the supporting plate shown in Fig. I.

In the Figures I to III inclusive is represented one form of the invention which is characterized by the combination cooling and heating tower and liquefying condenser attached.

The tower 1 is surrounded by the coil 2 which is within the space 3 in casing 4, which space is provided with suitable heat insulation. The activated carbon 5 is supported in the tower by the perforated plate 6 shown in plan in Fig. III. Plate 7 is a similar plate placed in the top of the tower above the activated carbon. The plates 6 and 7 are held in place by the special castings 8 which also serve for the intake and exit of gases to and from the tower. The inner coil 9 supplements the coil 2 giving a rapid transfer of heat away from and to the activated carbon as required. The entrance and exits 10 and 11 are the connections for cooling and heating media to be used in the process. The valves 12 give accurate control of the temperature by regulating the flow of cooling and heating media. The gauge 13 indicates the pressure attained. 14 is the intake of the gases to be liquefied. When it is desired to employ a vacuum for aiding the removal of the gases evolved from the activated carbon, a vacuum pump V is inserted in the pipe 16 and it is preferable to have the vacuum pump exhaust under pressure. The valve 15 controls the flow of gas from the tower 1 through the pipe 16 to the manifold 17 in the condenser. The cooling coils 18 encased in tower 19 are continuously cooled by circulating cooling media. The liquefaction occurs for the most part in the coils 18 but partially also in manifolds 17 and 20. Manifold 20 conducts the liquid to the exit 21 from which the liquid is removed.

The outer casing 22 completely surrounds the cooling coils 18 and the intervening space 24 is completely filled with cooling medium which is kept in constant circulation to give a rapid cooling effect. The cooling medium enters thru an intake 25 and exists at 26. The gauge 23 indicates the pressure within the condenser.

It is of course obvious that other suitable forms of condenser may be used instead of this specific form, the condenser being adapted to cool or liquefy the distillate either with or without compression. Sometimes the gases are passed thru the condenser with no attempt to liquefy the same in which case the condenser serves as a cooler for the gases which pass thru the same. When not desirable to pass the unabsorbed gases thru the condenser the gases are exhausted from the tower thru exit 27. The appropriate valves as indicated are used to control the direction of movement of the gases, distillate, cooling media, heating media, steam, etc.

The general operation of the process is as follows:

The tower 1 filled with activated carbon is first saturated with the gas to be separated and recovered by passing the gaseous mixture into the tower thru the opening 14. Meantime the activated carbon within the tower is being cooled by the circulation of cooling medium adapted to produce a temperature substantially lower than room or atmospheric temperature. In this relation I may use ice water in some cases or I may use a salt brine which has been cooled by artificial refrigeration. Still again I may cool the activated carbon by making use of the refrigeration produced by direct expansion of a liquid refrigerant such as ammonia or sulphur dioxide. Still again I may cool the activated carbon by means of liquid air or by highly compressed air, expanding in such a manner as to obtain the cooling effect by the expansion of the air. Other cooling media may be applied to give the same general effect.

Particularly, when I operate at very low temperatures both the internal cooling coils 9 and the external coils 2 are used. By use of the external coil 2 in conjunction with internal coil 9 I maintain the cooled condition and avoid radiation losses which are difficult to take care of otherwise. At the very low temperature especially great precaution must be taken to thoroughly insulate the towers to prevent large radiation losses which would otherwise occur.

Sometimes I prefer to use different cooling media in the two sets of coils in which case I usually employ the coldest medium within the inner coil 9 and a less cold refrigerating agent in the outer coil 2. In some cases the expanded refrigerating medium from coil 9 is caused to pass thru external coil 2, thus utilizing the latest cold remaining in the refrigerating medium as it has passed thru the internal coil. Usually, however, it is easier to pass different portions of the cooling medium without the double use of the same. Certain points of economical advantage, however, are obtained in the double use of the refrigerating medium.

In some cases in which the amount of adsorbable gas is relatively high in percentage content the adsorptive power of the activated carbon is so great that as soon as the gas mixture contacts thoroughly with the activated carbon and the temperature becomes lowered the adsorbable gas is taken up so rapidly that the gauge 13 indicates a partial vacuum created within the tower. In such cases wherein the percentage of adsorbable gases is relatively small no such effect is noticeable. In those cases where the adsorption is not so rapid as desired it is sometimes advisable to supply the gaseous mixture to tower 1 under pressure and such step is clearly within the spirit of the invention.

When the gas adsorption is complete and the inflow of gas is stopped and the cooling ceased the cooling is then started in the condenser and the valve 15 is opened to allow distillate to flow from the tower to the condenser. The gauge 23 indicates the pressure within the condenser. The stop cock regulating the exit of liquid at 21 is opened just enough to remove the liquid into a conveniently cooled container as rapidly as formed yet maintaining sufficient pressure within the system to liquefy the gas being distilled from the tower 1.

In some cases I prefer to use the same cooling medium for the condenser as is used for the cooling of the towers. In other cases I have been able to use the expanded gases or the exhaust brine from the cooling of the towers for the purpose of cooling the condenser. With low boiling point gases or gases of high vapor pressure at ordinary temperatures I cool the condenser to temperatures substantially below ordinary atmospheric or room temperatures. In any case, however, sufficient cooling must be used in conjunction with the pressure maintained within the condensing coil to liquefy the gas being distilled from tower 1.

The towers are gradually heated to procure a steady evolution of distilled gas by passing hot water or steam thru the coils previously used for cooling purposes.

In certain cases I prefer to use a separate coil system embedded in the activated carbon for heating means. The heat treatment removes the gas from the tower after which cooling liquefies it in the condenser. When the adsorbed gases has been distilled from the activated carbon the tower is again cooled as before and saturated with gas anew, after which the tower is again heated and the process repeated as before. By constant repetition of these steps the cycle is maintained readily.

Instead of a single tower being used two or more units are equally applicable. Further, any size of units can be used to give the capacity desired. Ordinarily it is desirable to operate at least two towers at a time in conjunction with the same condenser inasmuch as one tower can be in process of saturation while another tower is being distilled and still another tower may be in operation of cooling, thus maintaining a more continuous separation and production of the liquid or gases desired.

In the concentration or separation of gases the unadsorbed gases may be allowed to pass thru the carbon tower and then thru the condenser without liquefaction, or these gases may be by-passed at 19 as indicated in the drawings and not allowed to enter the condenser. Such gases may be then allowed to go to waste or be collected and otherwise suitably disposed of.

After the activated carbon is fully saturated with the gases being adsorbed the by-pass valve is closed and the valve to the condenser is opened to allow the adsorbed gas to pass to the condenser when the activated carbon is being heated in process of distillation.

In this invention the gas which is to be concentrated or recovered is adsorbed in activated carbon. Activated carbon is carbon or carbon containing material. One of the best treatments to activate carbon is to heat the carbon or carbon containing material for an extended period of time at temperatures above 700° C. in the presence of steam, the time being inversely proportional to the temperature. The activated carbon so produced is then used to adsorb the gas to be recovered or concentrated.

After the activated carbon has been essentially saturated with the adsorbable gas then the carbon and contained gas is heated. The heating causes the gas to be driven out of the activated carbon and such evolved gas is then condensed. In many cases I prefer to evolve the gas by the application of heat and utilize the pressure caused by evolution of the gas within a closed system which is cooled sufficiently to liquefy the gas. In other cases, however, I cool the condenser and condense without the use of pressure.

The activated charcoal adsorbs gases with great force. The intense attraction is manifected by the liberation of much heat and I have found it necessary in many cases to remove this heat of adsorption. I have found that unless the heat is removed the charcoal become very warm, in fact so warm that at the increased temperature thus produced, the charcoal no longer takes up as much gas as it otherwise should.

In the usual case of the separation and recovery of gases water cooling is sufficient to remove the heat of adsorption to give a practical operation of the system and effect an economical recovery of the adsorbable gases. However, there are cases in which water cooling is not adequate and much more intense cooling must be supplied. The degree of artificial cooling supplied depends upon the particular requirement. Sometimes I prefer to pass ice water through the coils embedded in the activated charcoal in order to accomplish my purposes. In many cases, however, this is not sufficient cooling and a salt brine which has been artificially cooled is used.

In certain cases, particularly when recovering or separating gases of low boiling points and which have relatively high vapor pressure at ordinary temperatures it is necessary to cool with such a medium as direct expansion of liquid ammonia, in which cases the ammonia is expanded directly in the coils which are embedded in the activated charcoal.

With very low boiling point liquids requiring very low temperatures in cooling the activated charcoal, for best results it is sometimes necessary to cool by expanding liquid air. I have found that these lower temperatures not only increase the adsorbable value of the charcoal, thus giving increased capacity to the activated charcoal, but in some cases this type of cooling is absolutely necessary to accomplish in full the separation completely, particularly with low boiling point gases. On the other hand, cooling the activated charcoal to very low temperature imparts to the activated charcoal the property of complete adsorption of adsorbable from unadsorbable gases and makes possible a complete separation which otherwise would not be the case.

In some instances while the activated charcoal when cooled to approximately atmospheric temperatures gives a practical recovery result, that is to say, gives a high yield of adsorbable constituents, yet in some cases in practical operation small amounts of the adsorbable gases are allowed to pass thru the activated charcoal unadsorbed thus contaminating the unadsorbable gases and when a very complete separation is desired in such cases, such may be frequently accomplished by cooling the activated charcoal to very low temperatures as above described, even cooling the activated charcoal down to the temperature produced by the expansion of liquid air.

Frequently also in this case, pressure applied to gases being treated is used to supplement the extreme cooling, such being found to be of advantage and highly desirable in some cases. When I cool to very low temperature I also cool the gaseous mixture before it enters the activated charcoal to more easily maintain the desired low temperature within the activated charcoal.

First the carbon is partially or wholly saturated with the particular gas to be recovered or concentrated, using the appropriate temperature, depending upon the specific character of the gas to be concentrated or recovered. After the adsorption is complete or sufficiently so for the purpose at hand the activated carbon is heated or allowed to become warm if the temperature is already below room temperature. The amount of heat applied and the rate of applying it is dependent upon the rate of evolution of gas desired. The evolved gas is caused to enter a cooling chamber or condenser which is cooled by the appropriate means, either using cold water, ice, circulating salt brine which is cooled by any refrigeration method in common use. Still further, the condenser may be cooled by the expansion of liquefied or compressed gases such as air, ammonia, sulphur dioxide, etc.; in fact, cooled by any of the regular refrigerating gases constituting conventional cooling practice.

When the evolved gas is not desired in a liquid form the gas is conducted directly or through the condenser to a storage vessel or to any other place desired, either with or without cooling the evolved gas as occasion may require.

When I supplement cooling with compression I use a mechanical compressor such as a piston pump or utilize the compression produced by rapidly evolved gases as they are forced from the charcoal by the application of heat. The amount of cooling and compression may vary within large limits, the desired temperature or pressure being different for different cases. Generally speaking, I employ only cooling to condense gases or vapors having low vapor pressure at ordinary temperatures whereas I prefer to use compression of vapors of relatively high vapor pressure at ordinary temperatures.

Usually, when I distill I apply heat directly by injecting steam through the pipe 28 and valve 29 directly to the charcoal and when I apply heat indirectly I ordinarily do so by heating with steam coils. While other heating means may be employed I have found that steam heating is the most practical in the usual cases. In some instances I prefer to evacuate using a vacuum pump and when using vacuo I usually also heat the activated charcoal at the same time to evolve the gases more rapidly. The evolved gases are passed to a condenser which is appropriately cooled in order to liquefy the gases or vapors being recovered. When the removal of the gases from the charcoal is being accomplished by aid of vacuum I ordinarily exhaust from the vacuum pump under pressure so that the gases are compressed within the condenser, thus lowering the tendency to vaporization and increasing the capacity of the condenser. In many cases the use of the compression within the condenser allows me to use cooling means very much more efficiently. For instance, with certain boiling point liquids without pressure I would be required to use a cold salt brine or a refrigerating system to obtain a sufficiently low temperature to cause liquefaction of the gas being recovered. However, by compressing the gas within the condenser I am enabled to use cooling water as it can be obtained from an ordinary water system or from a well to accomplish my purposes. When the vapor pressure of the liquid being recovered is rather low no compression is used or if any is used a slight pressure as a matter of convenience to increase the capacity of the condenser.

The liquid is then removed from the condenser to any point of storage or use and the operation is thus completed, having obtained the adsorbable gas finally in a liquid form and the unadsorbable gas either as in the gaseous form or in the form of liquid in special cases.

After the adsorbed gases and vapors have been distilled from the activated carbon, the carbon is cooled and used again to receive more gaseous mixture thus becoming again saturated with adsorbable gas. The activated charcoal is again distilled, etc., the process being made continuous. By having two more bodies of charcoal one body is separating adsorbable from unadsorbable gas, another similar body of activated charcoal is being distilled, and still another body of activated charcoal is being cooled in preparation for again receiving gaseous mixtures for another separation. The steps are repeated again and again in endless series thus giving continuous performance.

It should be noted that wherever in the appended claims the expression "activated carbon" is used, it is intended that this expression shall cover only carbonaceous material or carbon which has been subjected to a high temperature in excess of 700° C. in the presence of activating gases such as steam, carbon dioxide and others, and has thereby acquired high adsorption power for gases and vapors.

This application is a division in part of my co-pending applications Ser. No. 348,901, filed Jan. 2, 1920 and Ser. No. 397,745, filed July 20, 1920.

I claim as my invention:

1. In an apparatus for treating gases, a tower containing activated carbon and having an inlet for conducting gaseous material to the carbon for treatment thereby and an outlet for withdrawing gaseous material issuing from the carbon and a conduit in close proximity to the carbon and having separate connections to heating and cooling supplies.

2. In an apparatus for treating gases, a tower containing activated carbon and having an inlet for conducting gaseous material to the carbon for treatment thereby and an outlet for withdrawing gaseous material issuing from the carbon and a conduit embedded in the carbon and having separate valve-controlled connections to heating and cooling supplies.

3. In an apparatus for treating gases, a tower containing activated carbon and having an inlet for conducting gaseous material to the carbon for treatment thereby and an outlet for withdrawing gaseous material issuing from the carbon, a conduit embedded in the carbon, another conduit adjacent to and surrounding said tower, said conduits having connections to heating supplies.

4. In an apparatus for treating gases, a tower containing activated carbon and having an inlet for conducting gaseous material to the carbon for treatment thereby and an outlet for withdrawing gaseous material issuing from the carbon, a conduit embedded in the carbon, another conduit adjacent to and surrounding said tower, said conduits having separate valve-controlled connections to heating and cooling supplies.

5. In an apparatus for treating gases, a tower containing activated carbon and having an inlet for conducting gaseous material to the carbon for treatment thereby and an outlet for withdrawing gaseous material issuing from the carbon, a coil embedded in the carbon, another coil adjacent to and surrounding said tower, said coils having separate valve-controlled connections to heating and cooling supplies.

6. In an apparatus for treating gases, a tower containing activated carbon and having an inlet for conducting gaseous material to the carbon for treatment thereby, a condenser, a conduit from said tower to said condenser, means for withdrawing the condensate from said condenser and another conduit in close proximity to the carbon and having connection to a heating supply.

7. In an apparatus for treating gases, a tower containing activated carbon and having an inlet for conducting gaseous material to the carbon for treatment thereby, a condenser communicating with the interior of said tower for receiving gaseous material issuing from the carbon and a conduit embedded in the carbon and having separate valve-controlled connections to heating and cooling supplies.

8. In an apparatus for treating gases, a tower containing activated carbon and having an inlet for conducting gaseous material to the carbon for treatment thereby, a condenser communicating with said tower and adapted to receive gaseous material issuing from the carbon, an outlet for withdrawing the condensate from the condenser, a coil embedded in the carbon, another coil adjacent to and surrounding said tower, said coils having separate valve-controlled connections to heating and cooling supplies.

9. In an apparatus for treating gases, a tower containing activated carbon supported upon a perforated plate, an inlet for gaseous material passing through said perforated plate to said carbon, a condenser communicating at the upper part of the tower with the interior of the tower and adapted to receive gaseous material issuing from the carbon, a valve-controlled outlet for the condensate from said condenser, a conduit embedded in the carbon, another conduit adjacent to and surrounding said tower, said conduits having separate valve-controlled connections to heating and cooling supplies.

10. In an apparatus for treating gases, a tower containing activated carbon, a gas-compressor having valve communication with said tower, a condenser communicating with the interior of said tower and adapted to receive gaseous material issuing from the carbon and a conduit in close proximity to the carbon and having connection to a heating supply.

11. In an apparatus for treating gases, a tower containing activated carbon and having an inlet for conducting gaseous material to the carbon for treatment thereby, a vacuum pump having valve communication with the interior of said tower and a conduit in close proximity to the carbon and having connection to a heating supply.

12. In an apparatus for treating gases, a tower containing activated carbon, a gas-compressor and vacuum pump having valve communication with the interior of said tower, a condenser communicating with said vacuum pump, a valve outlet for condensate from said condenser, a conduit embedded in the carbon, another conduit adjacent to and surrounding said tower, said conduits having separate valve-controlled connections to heating and cooling supplies.

13. In an apparatus for treating gases, a tower containing activated carbon and having an inlet for conducting gaseous material to the carbon for treatment thereby and an outlet for withdrawing gaseous material issuing from the carbon, a conduit in close proximity to the carbon and having connection to a cooling supply and means for introducing heating fluid directly in contact with the activated carbon.

14. In an apparatus for treating gases, a tower containing activated carbon, an inlet for conducting gaseous material to the carbon for treatment thereby, a condenser having valve communication at the upper part of the tower with the interior of the tower and adapted to receive gaseous material issuing from the carbon, a valve-controlled outlet for the condensate from said condenser, means for by-passing unadsorbed gas from said tower and away from said condenser, a conduit embedded in the carbon, another conduit adjacent to and surrounding said tower, said conduits having separate valve-controlled connections to heating and cooling supplies.

15. In an apparatus for treating gases, a tower containing activated carbon and having an inlet for conducting gaseous material to the carbon for treatment thereby, a condenser, a conduit from said tower to said condenser, means for withdrawing the condensate from said condenser, means for by-passing gas from said tower away from said condenser and another conduit in close proximity to the carbon and having connection to a heating supply.

16. In an apparatus for treating gases, a tower containing activated carbon and having an inlet for conducting gaseous material to the carbon for treatment thereby, a condenser communicating with the interior of said tower for receiving gaseous material issuing from the carbon, means for by-passing gas from said tower and away from said condenser and a conduit embedded in the carbon and having separate valve-controlled connections to heating and cooling supplies.

In testimony whereof, I hereunto affix my signature.

OSCAR L. BARNEBEY